(12) United States Patent
Patel et al.

(10) Patent No.: US 9,847,939 B2
(45) Date of Patent: Dec. 19, 2017

(54) OPTIMAL ROUTE REFLECTION USING EFFICIENT BORDER GATE PROTOCOL BEST PATH SELECTION

(71) Applicant: Cisco Technology, Inc., San Jose, CA (US)

(72) Inventors: Keyur Patel, San Jose, CA (US); Serpil Bayraktar, Los Gatos, CA (US); Manish Bhardwaj, San Francisco, CA (US); David D. Ward, Los Gatos, CA (US); Arjun Sreekantiah, San Jose, CA (US); Burjiz Pithawala, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 137 days.

(21) Appl. No.: 14/878,014

(22) Filed: Oct. 8, 2015

(65) Prior Publication Data
US 2017/0104676 A1    Apr. 13, 2017

(51) Int. Cl.
*H04L 12/26* (2006.01)
*H04L 12/721* (2013.01)
*H04L 12/24* (2006.01)

(52) U.S. Cl.
CPC .......... *H04L 45/70* (2013.01); *H04L 41/0893* (2013.01); *H04L 43/50* (2013.01)

(58) Field of Classification Search
CPC ................. H04L 45/70; H04L 43/08
See application file for complete search history.

(56) References Cited

U.S. PATENT DOCUMENTS

| | | | |
|---|---|---|---|
| 8,537,840 B1 | 9/2013 | Raszuk et al. | |
| 2003/0174653 A1* | 9/2003 | Basu | H04L 45/52 370/238 |
| 2004/0044786 A1* | 3/2004 | Basso | H04L 45/742 709/238 |
| 2005/0047353 A1* | 3/2005 | Hares | H04L 45/02 370/255 |
| 2006/0291446 A1* | 12/2006 | Caldwell | H04L 45/42 370/351 |

(Continued)

OTHER PUBLICATIONS

"BGP Best Path Selection Algorithm", Document ID: 13753, Cisco Systems, Inc., Updated Jun. 13, 2014, 8 pages.

*Primary Examiner* — Clemence Han
(74) *Attorney, Agent, or Firm* — Edell, Shapiro & Finnan, LLC

(57) ABSTRACT

A network includes a route reflector peered with client routers. From a perspective of the route reflector, a best path to the destination address is selected by applying to candidate paths ordered comparison tests that progress from policy tests through one or more additional tests until the best path is selected. A determination is made as to whether the best path was selected based on the policy tests exclusively. If the best path was selected based on the policy tests exclusively, the best path is assigned to each of the client routers. If the best path was not selected based on the policy tests exclusively, from a perspective of each client router, a respective best path is selected by applying to the candidate paths the one or more additional tests, and the respective best paths are assigned to the respective client routers.

21 Claims, 6 Drawing Sheets

(56) References Cited

U.S. PATENT DOCUMENTS

| | | | | |
|---|---|---|---|---|
| 2007/0214280 A1* | 9/2007 | Patel | .................. | H04L 45/04 709/239 |
| 2010/0195506 A1* | 8/2010 | Shaikh | .................. | H04L 41/147 370/242 |
| 2012/0281539 A1* | 11/2012 | Patel | .................. | H04L 45/04 370/241 |

* cited by examiner

US 9,847,939 B2

OPTIMAL ROUTE REFLECTION USING EFFICIENT BORDER GATE PROTOCOL BEST PATH SELECTION

TECHNICAL FIELD

The present disclosure relates to Border Gate Protocol (BGP) routing.

BACKGROUND

A network of autonomous systems, also referred to herein as a Border Gate Protocol (BGP) network, uses "hot potato" routing to direct traffic from a given router in the network to closest egress points within the BGP network. The BGP network includes concentrator routers called route reflectors that are peered with BGP client routers of the route reflector. A route reflector uses a BGP best path algorithm to select an egress point closest to the route reflector. The egress point is a BGP best path from a perspective of the route reflector, but is not necessarily a best path for each of the client routers. BGP Optimal Route Reflection (ORR) allows route reflectors to operate from a cloud environment without compromising hot potato routing. In BGP ORR, the route reflectors use the BGP best path algorithm to select customized best paths for the route reflector and its ORR client routers.

Conventional BGP ORR requires the router reflector to execute a conventional BGP best path algorithm multiple times, once for the router reflector and then once per ORR client router. This is computationally wasteful in situations where the route reflector and the ORR client routers all share the same best path. In addition, the conventional BGP best path algorithm uses a fixed set of ordered comparison tests, even when some of the tests are unnecessary, which is also computationally wasteful.

DESCRIPTION OF EXAMPLE EMBODIMENTS

Overview

A route reflector in a network is peered with client routers according to the Border Gateway Protocol. The client routers advertise to the route reflector respective paths to a destination address. From a perspective of the route reflector, a best path among the paths to the destination address is selected by applying to the paths ordered comparison tests that progress from policy tests through one or more additional tests until the best path is selected. A determination is made as to whether the best path was selected based on the policy tests exclusively. If the best path was selected based on the policy tests exclusively, the best path is assigned to each of the client routers as the best path to the destination address. If the best path was not selected based on the policy based tests exclusively, from a perspective of each client router, a respective best path is selected by applying to the paths the one or more additional tests instead of the policy tests, and the respective best paths are assigned to the respective client routers.

Example Embodiments

Figure 1:
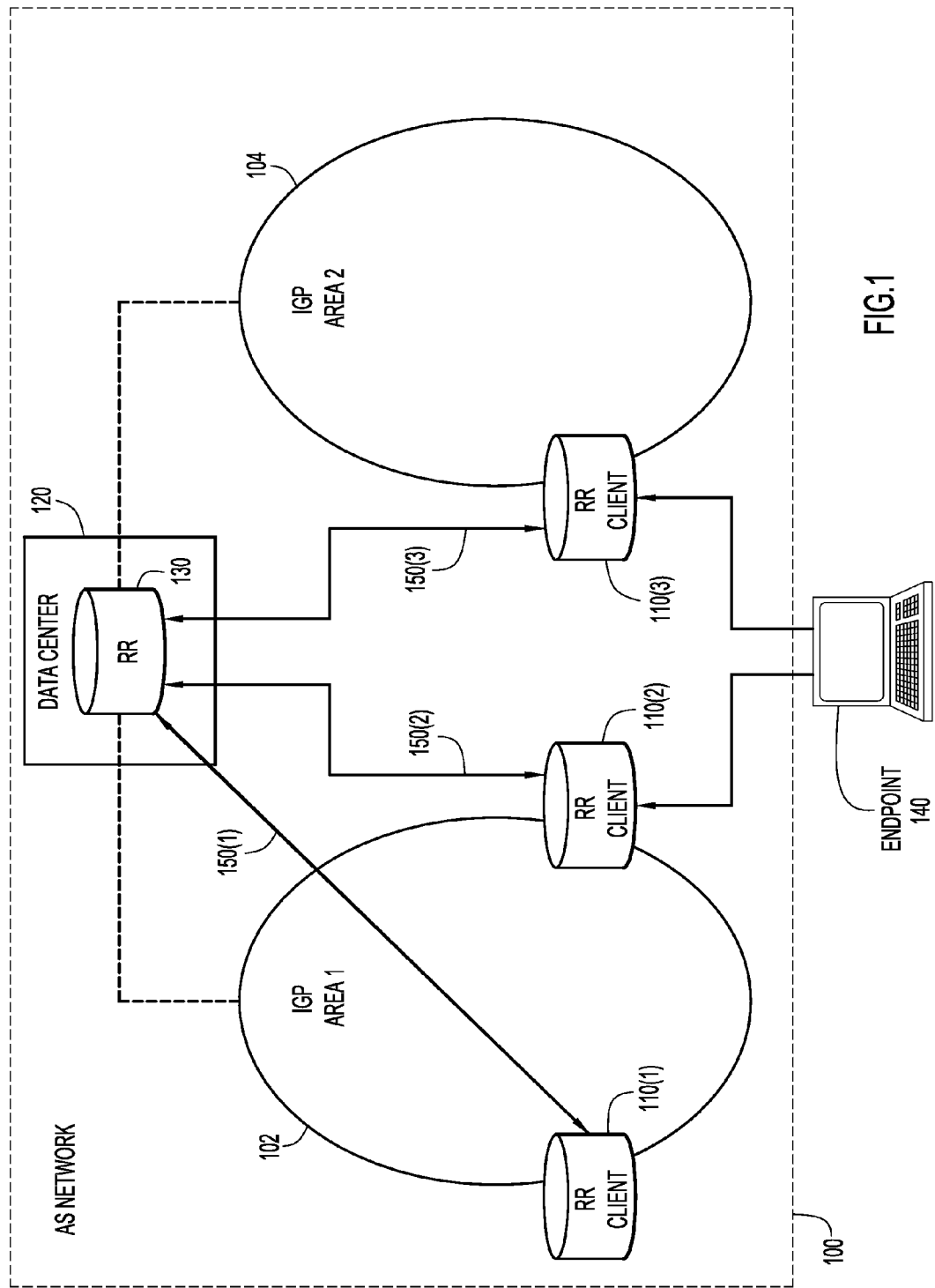
FIG. 1 is a block diagram of a network of autonomous systems (also referred to as a Border Gate Protocol (BGP) network) in which embodiments directed to BGP optimal route reflection (ORR) may be implemented, according to an example embodiment.

Referring to FIG. 1, there is shown a block diagram of a network of autonomous systems 100 (also referred to as an autonomous system (AS) network 100) in which embodiments directed to Border Gate Protocol (BGP) optimal route reflection (ORR) presented herein may be implemented. AS network 100 includes router domains 102 and 104, which may be in respective autonomous systems. Router domain 102 includes client routers 110(1) and 110(2), and router domain 104 includes a client router 110(3). In an embodiment, router domains 102 and 104 each represent an Interior Gateway Protocol (IGP) area of a respective autonomous system. AS network 100 also includes a data center 120 that hosts a cloud-based route reflector (RR) router 130 (also referred to more simply as a "route reflector" 130). AS network 100 provides packet routing to and from a destination address, such as an Internet Protocol (IP) address prefix, associated with an endpoint device 140, such as a computer server or a client device. FIG. 1 is provided by way of example only, and there may be any number of router domains/autonomous systems, routers within the router domains, and endpoint devices/destination addresses reachable through the various autonomous systems.

AS network 100 implements the Interior Gateway Protocol (IGP) routing to route packets within IGP areas 102 and 104. IGP routing exchanges IGP reachability/routing information, including destination addresses, routing metrics, and router topology mappings, between routers within a given IGP area (e.g., within IGP area 102 or 104), and determines how to route packets within the given IGP area based on the exchanged information. AS network 100 also operates in accordance with BGP routing to route packets between the autonomous systems of IGP areas 102 and 104. Thus, AS network 100 may be referred to as BGP network 100. BGP routing (i) exchanges BGP reachability/routing information between client routers 110 in each of IGP areas 102 and 104 and route reflector 130, (ii) determines or selects, using one or more BGP best path selection algorithms, best paths to various destination addresses based on the exchanged information, and (iii) disseminates the best paths as forwarding paths to the routers in each IGP area. Routers 130 and 110 install the best paths in their IP forwarding tables, which are used to make packet forwarding decisions.

Embodiments of BGP routing presented herein are now described at a high level. To enable the above-mentioned exchange of BGP information between the various routers in AS network 100, route reflector 130 establishes a respective logical connection 150(i) with each client router 110(i) in a hub-and-spoke configuration, where the hub represents route reflector 130 and the spokes represent respective ones of logical connections 150(*i*) to respective ones of client routers 110(*i*). Logical connections 150(1)-150(3) (collectively "150") represent BGP "peer" connections between BGP peers, i.e., between router reflector 130 and each peer (client) router 110(*i*) connected to the router reflector. In this configuration, client routers 110 are referred to as BGP "client routers" of router reflector 130. Route reflector 130 receives BGP messages from AS network 100, including client routers 110, over peer connections 150. The BGP messages include client router information, such as client router attributes and path attributes (e.g., IGP metrics/path costs) associated with client routers 110, including the IGP reachability/routing information, as would be appreciated by one of ordinary skill in the relevant arts. This information is used by route reflector 130 to determine/select best paths in AS network 100 as described below.

Client routers 110(1) and 110(2) are able to reach endpoint device 140, i.e., the destination address of the endpoint device, via respective egress or exit points of IGP area 1 that are associated with those client routers. The exit points may be an Internet point of presence, or a border router, for example. Thus, client routers 110(1) and 110(2) represent respective paths or "next hops" to the destination address (of endpoint device 140) from a perspective of route reflector 130, for example. Client routers 110(1) and 110(2) advertise their respective paths to route reflector 130 over peer connections 150(1) and 150(2). In other words, each client router 110(1) and 110(2) advertises itself to route reflector 130 as a path or next hop leading to the destination address. Collectively, the advertised paths represent a set of candidate paths to reach the destination address.

Route reflector 130 uses the BGP best path selection algorithm (referred to more simply as the "BGP algorithm") to determine or select a best path among the candidate paths leading to the destination address. Using the BGP algorithm, route reflector 130 determines the best path from a perspective or position of the route reflector in the topology of AS network 100. The "perspective" of a router takes into account a topological position of the given router within a network, including physical connections or links to adjacent routers and their associated path costs, as well as a set of links that may be traversed to a destination address. The best path from the perspective of router reflector 130 may not be the best path to the destination address for all of client routers 110. Thus, route reflector 130 may also apply the BGP algorithm from the perspective of each client router 110(*i*) in the topology of AS network 100 separately to determine a respective best path for each client router 110(*i*). In other words, route reflector 130 may determine an optimally customized best path for each client router 110(*i*), and announces the customized best path to each client router 110(*i*). This process is referred to as optimal route reflection (ORR). Thus, optical router reflection may require client router 130 to execute the BGP algorithm multiple times, once initially to select a best path from the perspective of the route reflector, and then additional times to select a best path from the perspective of each client router 110, separately.

An example of the BGP algorithm used to select a best path from among multiple advertised paths (whether from the perspective of client router 130 or each client router 110(*i*)) is now described. Assume that route reflector 130 arranges the advertised paths as a list of candidate paths 1, 2, 3, . . . N. The BGP algorithm assigns a first path (e.g., path 1) in the list as a current best path. The BGP algorithm compares the current best path (e.g., path 1) to a next path (e.g., path 2) using ordered comparison tests or selection criteria to select a next current best path (i.e., a preferred one of compared paths 1 and 2). The BGP algorithm then compares the next current best path (i.e., the preferred one of paths 1 and 2) to a next path (e.g., path 3) using the comparison tests again. This successive comparing of pairs of paths to select next current best paths among the pairs of paths continues down the list of paths, until all N paths have been compared to each other either directly or indirectly using the comparison tests, and a final best path among the paths has been selected among the N paths.

Each time the BGP algorithm compares two paths to select a preferred one/current best path to be compared in a next iteration, the BGP algorithm sequentially applies the ordered comparison tests to the two compared paths, i.e., the BGP algorithm progresses through the comparison tests until one of the comparison tests prefers one path over the other. The following is an example list of the ordered comparison tests that is known to one having ordinary skill in the relevant arts, in which each "prefer" step represents a comparison test selection criterion used to compare corresponding attributes of two paths:

1. Prefer the path with a highest WEIGHT, which is a local parameter assigned to a router on which the WEIGHT is configured;
2. Prefer the path with a highest LOCAL_PREF;
3. Prefer the path that was locally originated via a network or aggregate BGP subcommand or through redistribution from an IGP area. Local paths that are sourced by the network or redistribute commands are preferred over local aggregates that are sourced by an aggregate-address command;
4. Prefer the path with a shortest AS_PATH. The AS_PATH is a path across BGP autonomous systems. The AS_PATH attribute can be modified by BGP policy before being advertised by a client router, in fact, AS_PATH packing (where the same AS is repeated in the PATH multiple times) is a common arbitrary policy adjustment used to make the AS_PATH longer essentially to prevent a path being preferred based on the lengthened AS_PATH. Thus, the Best Path algorithm may use an advertised AS_PATH that has been modified by BGP policy at intermediate nodes in a network (e.g., client routers). In contrast, the IGP metric in step 8 (see below) cannot be modified arbitrarily by BGP policy. A path selected as a best path from the perspective of the router reflector based on AS_PATH will always win as a best path when computed from the perspective of the client routers, e.g., in example method 400 described below in connection with FIG. 4;
5. Prefer the path with a lowest origin type, where IGP is lower than Exterior Gateway Protocol (EGP);
6. Prefer the path with a lowest multi-exit discriminator (MED);
7. Prefer External BGP (eBGP) paths over Internal BGP (iBGP) paths;
8. Prefer the path with a lowest IGP metric (path cost or distance metric) to the BGP next hop;
9. Determine if multiple paths require installation in the routing table for BGP multipath, and continue if the best path is not yet selected;
10. When both paths are external, prefer the path that was received first (the oldest one);
11. Prefer the route that comes from the BGP router with a lowest router identifier (ID), where the router ID is a highest IP address on the router, with preference given to loopback addresses;

12. If the originator or router ID is the same for multiple paths, prefer the path with a minimum cluster list length; and
13. Prefer the path that comes from a lowest neighbor address.

As the size of AS network 100 scales upward to include large numbers of client routers 110 and correspondingly large numbers of candidate paths to the destination address, conventional optimal router reflection becomes computationally burdensome. This is because route reflector 130 may execute the BGP algorithm hundreds or even thousands of times to select best paths from the perspectives of all of the large number of client routers in addition to the route reflector itself and, each time the BGP algorithm is executed to select a best path, the large numbers of candidate paths must be compared in successive pairs using the ordered comparison tests (e.g., the 13 comparison tests listed above).

Accordingly, embodiments presented herein streamline optimal router reflection to reduce computational complexity compared to conventional optimal route reflection. In one embodiment, client router 130 determines a best path from its own perspective, and also whether that best path suffices for all of client routers 110, i.e., whether the determined best path will be the same for the client routers. If the best path does suffice, the client router announces/assigns the best path to client routers 110, and skips running the BGP algorithm repeatedly from the perspectives of the client routers. On the other hand, if the best path does not suffice, route reflector 130 applies the BGP algorithm from the perspectives of each of client routers 110, but, before doing so, determines whether certain ones of the comparison tests in the BGP algorithm may be skipped in each application of the BGP algorithm. If certain comparison tests may be skipped, client router 130 runs the BGP algorithm from the perspectives of client routers 110, but selectively configures the BGP algorithm to skip the certain comparison tests, which advantageously reduces the number of comparison tests that must be used across all of the client routers.

The manner in which the BGP algorithm may be selectively configured to skip certain tests is now described. The comparison tests 1-13 listed above may be divided among multiple priority levels, each priority level including one or more of the comparison tests, as described below in connection with FIG. 2.

Figure 2:
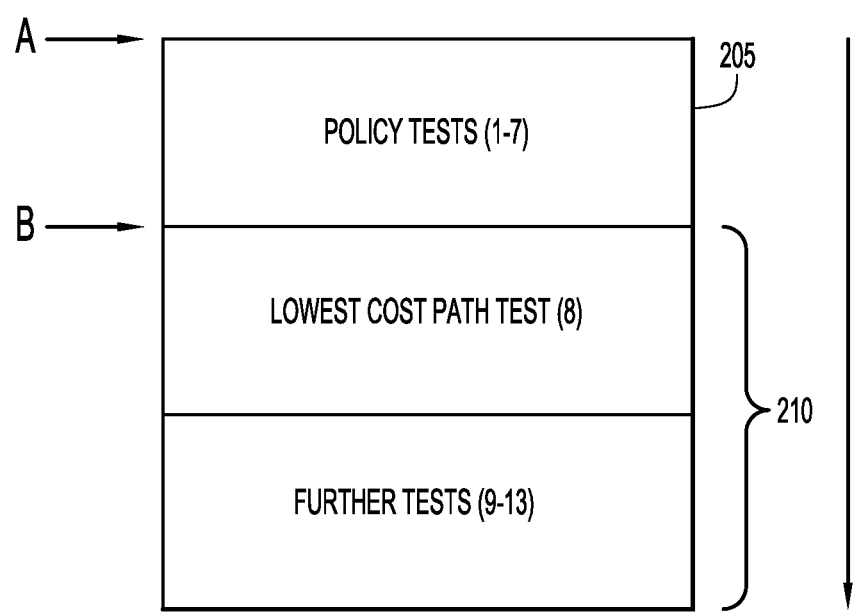
FIG. 2 is an illustration of an arrangement of ordered comparison tests used in a BGP best path selection algorithm, where the ordered comparison tests are divided into two priority levels and have selectable starting points, according to an example embodiment.

With reference to FIG. 2, there is an example arrangement of comparison tests 200 that divides comparison tests 1-13 into two priority levels or groups and includes selectable, respective entry or starting points into the priority levels. Arrangement 200 includes: a first level 205 beginning at a selectable starting point A and that includes comparison tests 1-7 referred to generally as "policy" tests that each prefer one path over another path based on a criterion that is not a lowest cost path criterion, but rather a "policy" criterion; and a second level 210 beginning at a selectable starting point B and that includes (i) test 8 referred to generally as a lowest cost path test that prefers one path over another based on the lowest path criterion (e.g., an IGP metric) not a policy-based criterion, and (ii) tests 9-13 referred to generally as "further tests." Arrangement 200 is an example only, and more or less priority levels and starting points may be used in other examples.

Starting points A and B in arrangement 200 represent selectable/programmable starting points for the BGP algorithm. One of starting points A or B may be selected as a comparison test starting point and provided to the BGP algorithm when the BGP algorithm is called to select a best path from a perspective of a given router. If starting point A is selected as a starting point and provided to the BGP algorithm, the BGP algorithm begins at comparison test 1 and progresses in an order of test 1, test 2, test 3, and so on through the remaining comparison tests until one of the comparison tests prefers one of the compared paths. If point B is selected as a starting point, the BGP algorithm skips comparison tests 1-7 (the policy tests) and begins at lowest cost path comparison test 8 and then progresses through tests 9-13. In other words, from point B, the BGP algorithm progresses in the order of test 8, test 9, test 10, and so on through the remaining comparison tests until one of the comparison tests prefers one of the compared paths.

Figure 3:
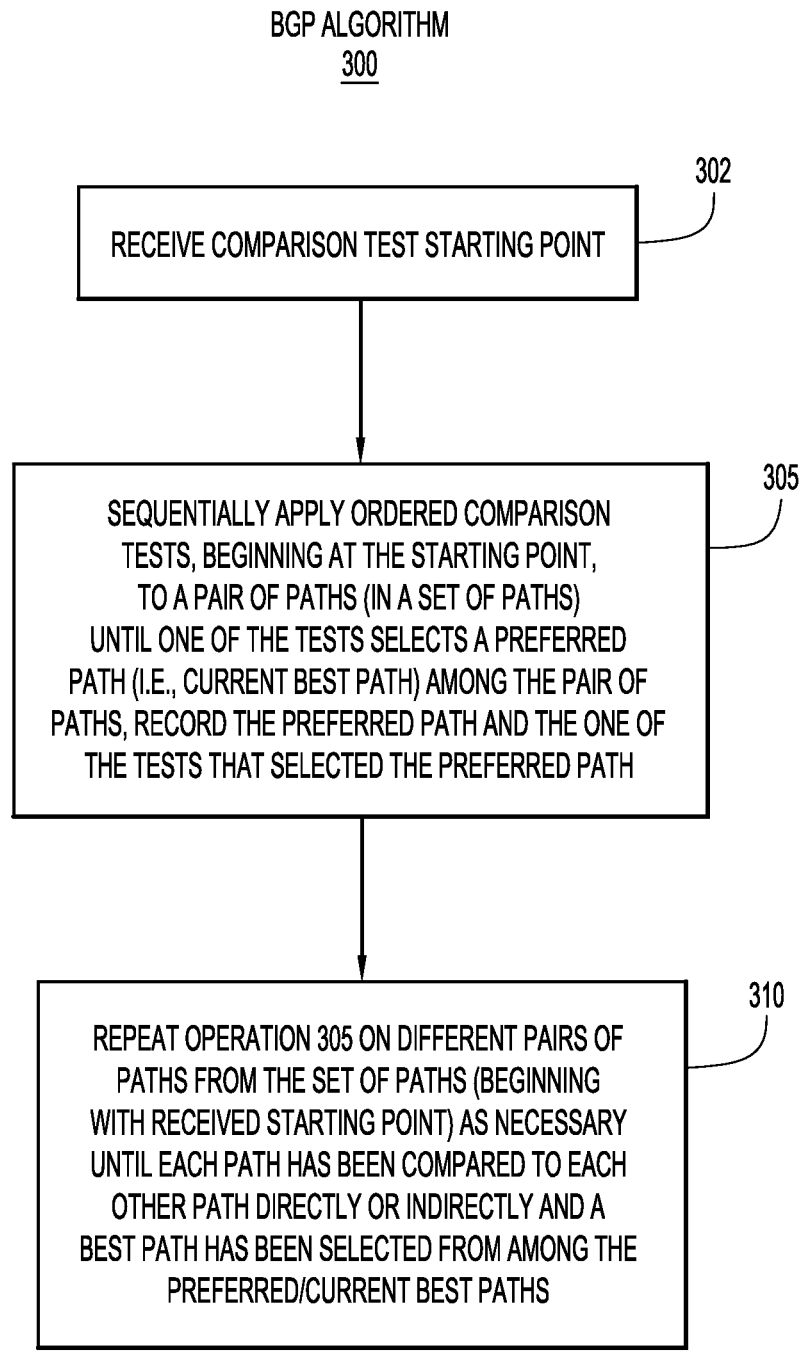
FIG. 3 is a flowchart of a BGP best path selection algorithm used to select a best path among a set of paths using the ordered comparison tests with selectable starting points of FIG. 2, according to an example embodiment.

With reference to FIG. 3, there is a flowchart of an example BGP algorithm 300 used to select a best path among a set of paths (i.e., advertised/candidate paths) using the ordered comparison tests (also referred to simply as "tests") and selectable starting points as described in connection with FIG. 2. BGP algorithm 300 may select a best path from the perspective of route reflector 130, or a best path from a perspective of one of client routers 110.

At 302, BGP algorithm 300 receives a starting point into the comparison tests (e.g., starting point A—test 1 or starting point B—test 8).

At 305, BGP algorithm 300 sequentially applies the ordered comparison tests to a first pair of paths (i.e., first compared paths) in the set of paths until one of the tests selects a preferred path among the pair of paths, i.e., until one of the tests prefers one of the compared paths over the other. To do this, BGP algorithm 300 sequentially applies the tests beginning at the starting point test (e.g., starting point A—test 1 or starting point B—test 8) and progresses through the tests sequentially (i.e., in sequence) toward the last test (e.g., test 13) until the one of the test selects the preferred path. The preferred path represents a current best path among the compared paths for this iteration in BGP algorithm 300. The preferred path and the particular test that selected the preferred path are intermediate results that are recorded so as to be accessible to other processes in optimal route reflection, e.g., to method 400 discussed below in connection with FIG. 4.

At 310, BGP algorithm 300 repeats operation 305 on different (next) pairs of paths in the set of paths as necessary until each path has been compared to each other path directly or indirectly, and as a result a best path has been selected from among the preferred paths. Each iteration of operation 310 compares the paths for that iteration beginning at the same starting point (e.g., starting point A or B) and progressing toward the last of the tests.

Figure 4:
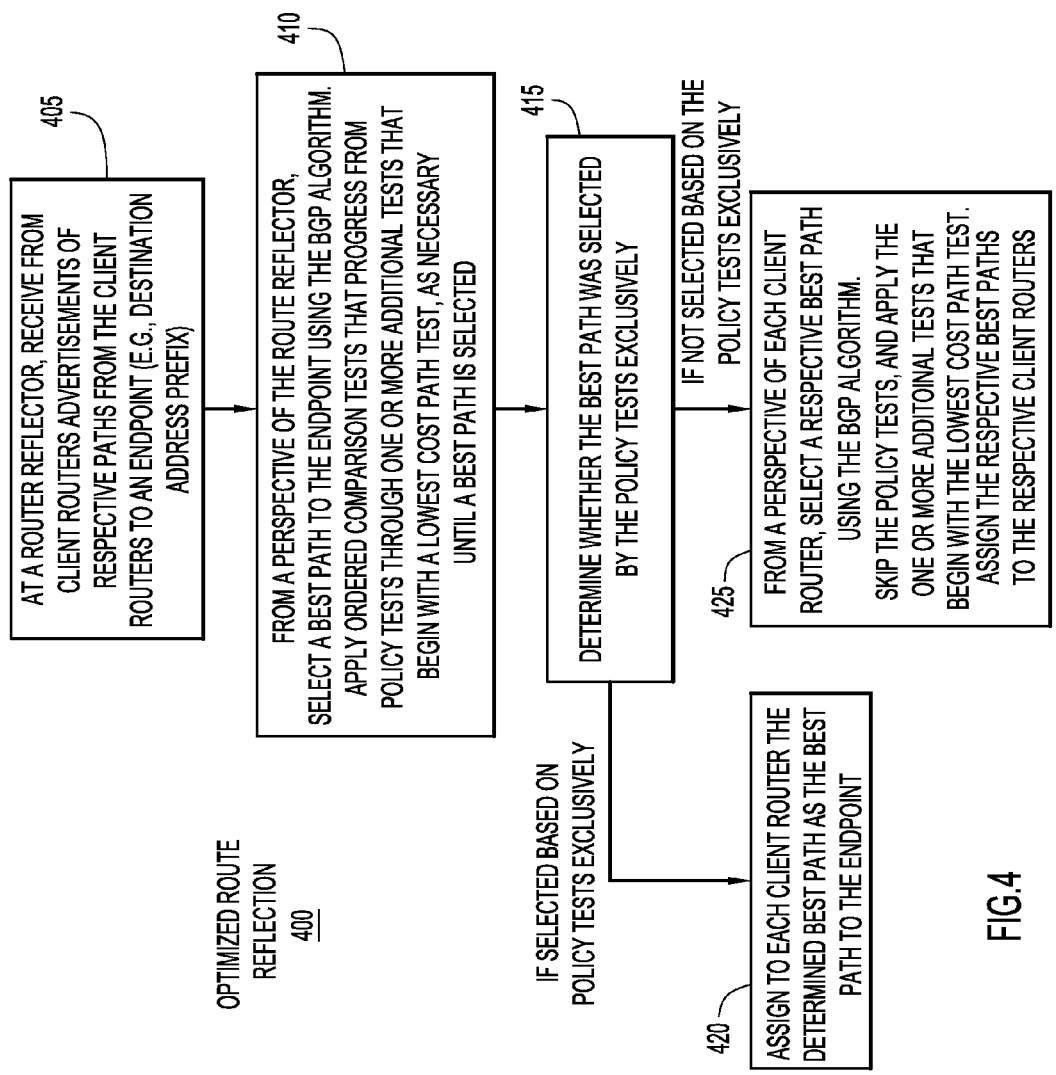
FIG. 4 is a flowchart of a method of BGP ORR performed by a route reflector in the network of FIG. 1, according to an example embodiment.

With reference to FIG. 4, there is a flowchart of a method 400 of BGP ORR performed by router reflector 130 in AS network. Method 400 incorporates features described above, including BGP algorithm 300. Client routers 110 may be referred to as ORR client routers 110.

At 405, route reflector 130 receives advertisements of respective paths to the destination address, e.g., a destination address prefix of endpoint device 140, from client routers 110.

At 410, router reflector uses/invokes BGP algorithm 300 to determine/select a best path among the advertised paths to the destination address from a perspective or position of route reflector 130 in AS network 100. Route reflector 130 selects starting point A—test 1 for the comparison tests in BGP algorithm 300. Thus, BGP algorithm 300 compares successive pairs of advertised paths beginning with policy tests 1-7, progressing to lowest cost path test 8, and then progressing to further tests 9-13 (i.e., by applying to each pair of paths the policy tests 1-7, the lowest cost path 8, and the further tests 9-13 in sequence beginning with the policy tests 1-7), until a first one of the tests determines the best path. Lowest cost path test 8 and further tests 9-13 are examples of one or more additional tests that follow policy tests 1-7. When the best path has been determined using BGP algorithm 300, all of the preferred paths (i.e., current best paths resulting from comparing successive pairs of paths) and the corresponding ones of the tests at which they were preferred/selected will have been recorded as intermediate results.

At 415, router reflector 130 determines whether the best path from the perspective of router reflector 130 was selected by policy tests 1-7 exclusively (i.e., the comparison tests never progressed past policy test 7 in selecting a preferred path) based on the recorded intermediate results. To do this, route reflector 130 examines the recorded intermediate results from BGP algorithm 300. If the recorded intermediate results indicate that all of the preferred paths were determined/selected by policy tests 1-7, then it is determined that the best path was selected by policy tests 1-7 exclusively. If the recorded intermediate results indicate otherwise, then it is determined that the best path was not determined by policy tests 1-7 exclusively. In other words, if the recorded intermediate results indicate that the best path was determined by at least one of additional tests 8-13, then it is determined that the best path was not selected by the policy tests 1-7.

If the best path from the perspective of router reflector 130 was selected by policy tests 1-7 exclusively, flow proceeds from 415 to 420. At 420, router reflector 130 assigns/announces the best path from the perspective of the router reflector to each of client routers 110, and does not determine best paths from the perspective of the client routers. The reason for this is that if the best path was selected from the perspective of router reflector 130 by policy tests 1-7 exclusively, respective best paths for client routers 110 will also be selected based on policy tests 1-7 because the policy tests always win over least cost path test 8 and further tests 9-13, and therefore it would be wasteful to run BGP algorithm 300 again from the perspectives of the client routers. Route reflector 130 sends information defining the best path selected at 410, e.g., a client router address or an egress point address, to client routers 110 over peer connections 150.

On the other hand, if the best path from the perspective of route reflector 130 was not selected by policy tests 1-7 exclusively, flow proceeds from 415 to 425. At 425, route reflector 130 repeatedly uses BGP algorithm 300 to determine/select a respective best path for each client router 110(i) from a perspective of the client router 110(i). At each iteration of BGP algorithm 300, route reflector 110 sets the starting point for the BGP algorithm to starting point B—lowest cost path test 8, so that the BGP algorithm skips policy tests 1-7 and begins with lowest cost path test 8 (i.e., applies to each pair of paths the lowest cost path 8 and further tests 9-13 in sequence beginning with the with lowest cost path test 8). Route reflector 130 assigns/announces to each client router 110(i) the best path determined for that client router. In operation 425, each client router 110(i) represents a shortest path first (SPF) route that is its own focus position for least cost path test 8 in BGP algorithm 300. Alternatively, in an example with many client routers 110, groups of two or more client routers that are topologically near each other may be represented by a single focus position or SPF route so that BGP algorithm 300 need only be executed one time for that SPF root (for multiple, grouped client routers), which reduces computational complexity.

BGP ORR method 400 may be summarized by the following operations, which introduce a "BGP algorithm result" that is set equal to "BESTPATH POLICY" if the comparison tests of the BGP algorithm collectively select a best path based on policy tests 1-7 exclusively, and that is set equal to "BESTPATH_IGP" if the comparison tests select the best path at lowest cost path test 8 or beyond:

1. For each destination address prefix n and its set of (candidate) paths p, the BGP algorithm is executed once from the perspective of the route reflector;
2. For the pairs of paths compared in the set of paths, the preferred paths (intermediate current best paths) and the test (e.g., 1, 2, 3, etc.) that preferred those paths are recorded. If all of the tests that resulted in preferred paths were policy tests 1-7, the BGP algorithm result is set to BESTPATH POLICY to indicate that the winning tests for all compared paths fell within tests 1-7. On the other hand, if the best path was selected based on least cost path test 8, the BGP algorithm result is set to BESTPATH_IGP to indicate that the winning test was least cost path test 8 (based on IGP metric);
3. If the BGP algorithm result is set to BESTPATH POLICY indicating the policy tests won, the best path is inherited by all of the client routers (because, policy tests will always win over the least cost path test regardless of router perspective); and
4. If the BGP algorithm result is set to BESTPATH IGP, then best paths are determined for each client router by skipping tests 1-7 and using instead the IGP metric in test 8. If two paths have a same IGP metric, further tests 9-13 (multipath, external check, lowest router-ID check, and neighbor address) are used to select the best path.

The above methods reduce computations in BGP ORR substantially as there are 1) no extra best path computations for client routers/SPF roots in case where the best path was selected from the perspective of the router reflector due to (superior) policy metrics, and 2) only IGP metric comparisons (and potentially multipath, external check, lowest router-id check, and neighbor address) in a case where the best path was selected due to the IGP metric.

Figure 5:
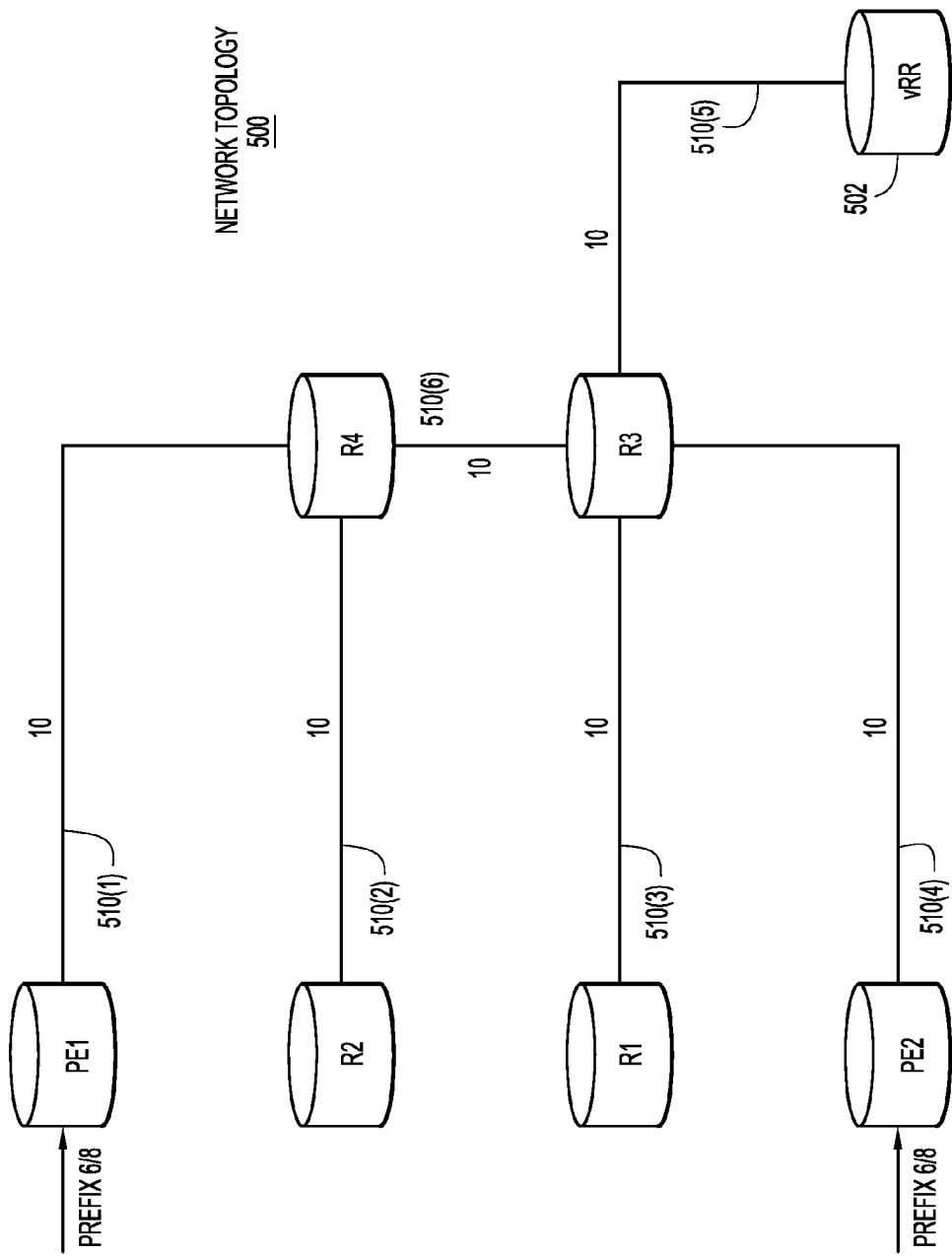
FIG. 5 is an illustration of a network topology in which BGP ORR may be implemented, according to an embodiment.

With reference to FIG. 5, there is an illustration of an example physical network topology 500 in which method 400 may be implemented. Topology 500 includes a cloud-based route reflector 502, also referred to as a virtual router reflector (vRR), configured similarly to route reflector 130. Topology 500 also includes client routers R1-R4, PE1, and PE2 that have established radial BGP peer connections (not shown in FIG. 5) with route reflector vRR. Route reflector vRR and client routers R1-R4, PE1, and PE2 are interconnected by network links 510 traversed by packets traversing network 500 toward a destination address prefix 6/8. In the example of FIG. 5, each link 510 is associated with a respective path cost or IGP metric of 10, although other paths costs may be assessed to each link. Client routers PE1 and PE2 have respective egress/exit points leading to (common) destination address prefix 6/8. Thus, routers PE1 and PE2 announce themselves to route reflector vRR as paths or next hops to the destination address. On the other hand, routers R1-R4 do not have exit points leading to destination address 6/8, so they do not announce themselves as paths to the destination address.

Route reflector vRR executes method 400 to select a best path among next hops PE1 and PE2 leading to destination address 6/8 from the perspective of the route reflector. If at operation 410 route reflector vRR determines a best path to destination address 6/8 based on policy tests 1-7, then at 420 the router reflector assigns that best path to each of routers R1-R4 and PE1 and PE2. For example, if route reflector vRR determines that router PE1 is the best path, the route reflector assigns PE1 as the best path to client routers R1-R4, PE1, and PE2, even though that best path may not represent a least cost path from a perspective of each of the client routers. In the example where router PE1 is the best path based on policy tests 1-7, all of client routers R1-R4, PE1, and PE2 having packets for destination address 6/8 forward their packets along appropriate ones of links 510 to router PE1.

Alternatively, if at 410 route reflector vRR determines a best path to destination address 6/8 based on least cost path test 8, then the router reflector will have selected router PE2 as the best path from a perspective of the route reflector because the path cost to router PE2 is 20 (i.e., 10+10, traversing links 510(5) and 510(4)) while the path cost to router PE1 is 30 (10+10+10, traversing links 510(5), 510(6), and 510(1)). At 425, router reflector vRR also selects a best path (either PE1 or PE2) from a perspective of each client router R1-R4, PE1, and PE2 beginning with the least cost path test, and assigns the respective best paths to the respective client routers. For example, the least cost paths are determined as follows:

1. For PE1: cost to PE1 is 0 and cost to PE2 is 30, so prefer PE1;
2. For R1: cost to PE1 is 30 and cost to PE2 is 20, so prefer PE2;
3. For R2: cost to PE1 is 20 and cost to PE2 is 30, so prefer PE1;
4. For R3: cost to PE1 is 20 and cost to PE2 is 10, so prefer PE2; and
5. For R4: cost to PE1 is 10 and cost to PE2 is 20, so prefer PE1.

Figure 6:
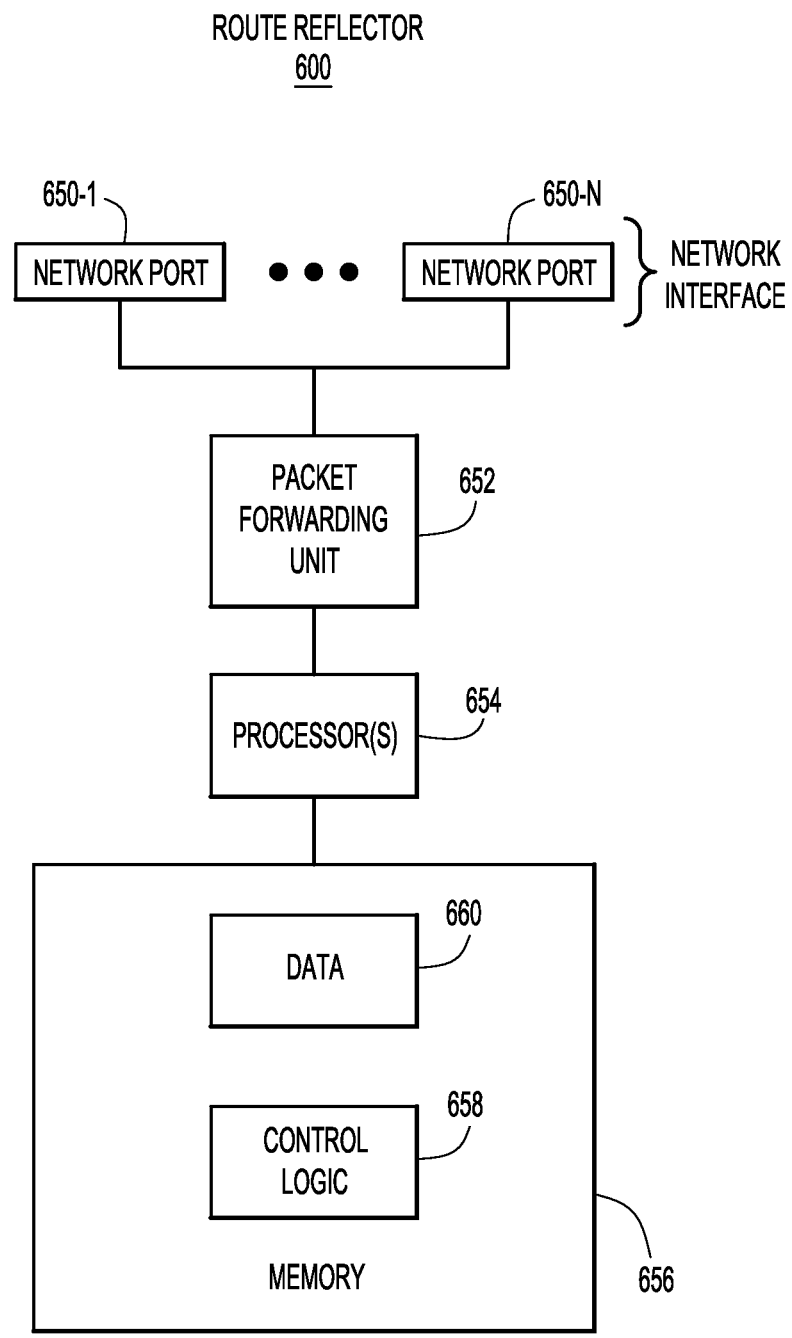
FIG. 6 is a block diagram of a route reflector configured to perform BGP ORR, according to an embodiment.

With reference to FIG. 6, there is a block diagram of a network device or system 600 representative of route reflector 130 and vRR 502. Network device 600 may include a plurality of network ports 650-1 through 650-N or other form of network interface, a packet forwarding unit 652 having forward tables used to make packet forwarding decisions, a processor 654 (or multiple processors) and memory 656. The memory stores instructions for implementing methods described herein.

The memory 656 may comprise read only memory (ROM), random access memory (RAM), magnetic disk storage media devices, optical storage media devices, flash memory devices, electrical, optical, or other physical/tangible (non-transitory) memory storage devices. The processor 654 is, for example, a microprocessor or a microcontroller that executes instructions stored in memory. Thus, in general, the memory 656 may comprise one or more tangible computer readable storage media (e.g., a memory device) encoded with software comprising computer executable instructions and when the software is executed (by the processor 654) it is operable to perform the operations described herein. Memory 656 stores control logic 658 to perform the BGP ORR methods/operations and the BGP algorithm/operations described herein. The memory may also store data 660 used and generated by logic 658, such as router attributes, such as IGP metrics, used in comparison tests, BGP algorithm starting points and intermediate results, determined best paths, and so on.

In summary, in one form, a method is provided comprising: at a route reflector in a network including client routers peered with the route reflector according to the Border Gateway Protocol and that advertise to the route reflector respective paths to a destination address: from a perspective of the route reflector, selecting among the paths a best path to the destination address by applying to the paths ordered comparison tests that progress from policy tests through one or more additional tests until the best path is selected; determining whether the best path was selected based on the policy tests exclusively; if the best path was selected based on the policy tests exclusively, assigning to each of the client routers the best path as the best path to the destination address; and if the best path was not selected based on the policy based tests exclusively: from a perspective of each client router, selecting a respective best path by applying to the paths the one or more additional tests instead of the policy tests; and assigning the respective best paths to the respective client routers.

In summary, in another form, an apparatus configured to operate as a router reflector device is provided, comprising: a network interface unit configured to communicate with a network including client routers peered with the route reflector according to the Border Gateway Protocol and that advertise to the route reflector respective paths to a destination address; and a processor coupled to the network interface unit and configured to: from a perspective of the route reflector, select among the paths a best path to the destination address by applying to the paths ordered comparison tests that progress from policy tests through one or more additional tests until the best path is selected; determine whether the best path was selected based on the policy tests exclusively; if the best path was selected based on the policy tests exclusively, assign to each of the client routers the best path as the best path to the destination address; and if the best path was not selected based on the policy based tests exclusively: from a perspective of each client router, select a respective best path by applying to the paths the one or more additional tests instead of the policy tests; and assign the respective best paths to the respective client routers.

In summary, in yet another form, a non-transitory processor readable medium is provided. The processor readable medium stores instructions that, when executed by a processor, cause the processor to on route reflector in a network including client routers peered with the route reflector according to the Border Gateway Protocol and that advertise to the route reflector respective paths to a destination address, cause the processor to: from a perspective of the route reflector, select among the paths a best path to the destination address by applying to the paths ordered comparison tests that progress from policy tests through one or more additional tests until the best path is selected; determine whether the best path was selected based on the policy tests exclusively; if the best path was selected based on the policy tests exclusively, assign to each of the client routers the best path as the best path to the destination address; and if the best path was not selected based on the policy based tests exclusively: from a perspective of each client router, select a respective best path by applying to the paths the one or more additional tests instead of the policy tests; and assign the respective best paths to the respective client routers.

The above description is intended by way of example only. Various modifications and structural changes may be made therein without departing from the scope of the concepts described herein and within the scope and range of equivalents of the claims.

What is claimed is:

1. A method comprising:
   at a route reflector in a network including client routers peered with the route reflector according to the Border Gateway Protocol and that advertise to the route reflector respective paths to a destination address:
    from a perspective of the route reflector, selecting among the paths a best path to the destination address by applying to the paths ordered comparison tests that progress from policy tests through one or more additional tests until the best path is selected;
    determining whether the best path was selected based on the policy tests exclusively;
    if the best path was selected based on the policy tests exclusively, assigning to each of the client routers the best path as the best path to the destination address; and
    if the best path was not selected based on the policy based tests exclusively:
        from a perspective of each client router, selecting a respective best path by applying to the paths the one or more additional tests instead of the policy tests; and
        assigning the respective best paths to the respective client routers.

2. The method of claim 1, wherein:
from the perspective of the router reflector, the applying to the paths the ordered comparison tests includes:
    applying the ordered comparison tests to a pair of the paths until one of the tests selects a preferred path among the pair of paths; and
    repeating the applying the ordered comparison tests to different pairs of the paths as necessary until the ordered comparison tests have selected the best path from among the preferred paths; and
the determining whether the best path was selected based on the policy tests exclusively includes determining whether the best path was selected based on the ones of the tests that selected the preferred paths.

3. The method of claim 1, wherein:
the one or more additional tests include a lowest cost path test followed by further tests; and
from the perspective of the router reflector, the applying includes applying to the paths the policy tests, the lowest cost path test, and the further tests in sequence until the best path is selected.

4. The method of claim 3, wherein, from the perspective of each client router, the applying includes applying to the paths the lowest cost path test and the further tests in sequence instead of the policy tests until the best path is selected.

5. The method of claim 4, wherein the lowest cost path test includes a lowest cost path test that prefers a path having a lowest Internal Gateway Protocol (IGP) metric indicative of path cost leading to the destination address.

6. The method of claim 5, wherein the applying the policy tests includes applying in sequence:
    a first policy test that prefers a path with a highest weight;
    a second policy test that prefers a path with a highest local preference; and
    a third policy test that prefers a path having a lowest origin type.

7. The method of claim 1, wherein the router reflector is a cloud-based route reflector.

8. The method of claim 1, wherein the destination address is advertised as a destination address prefix.

9. The method of claim 1, wherein the policy tests are not based on a lowest cost path criterion and the one or more additional tests include a lowest cost path test that is based on a lowest cost path criterion.

10. An apparatus configured to operate as a route reflector, the apparatus comprising:
    a network interface unit configured to communicate with a network including client routers peered with the route reflector according to the Border Gateway Protocol and that advertise to the route reflector respective paths to a destination address; and
    a processor coupled to the network interface unit and configured to:
        from a perspective of the route reflector, select among the paths a best path to the destination address by applying to the paths ordered comparison tests that progress from policy tests through one or more additional tests until the best path is selected;
        determine whether the best path was selected based on the policy tests exclusively;
        if the best path was selected based on the policy tests exclusively, assign to each of the client routers the best path as the best path to the destination address; and
        if the best path was not selected based on the policy based tests exclusively:
            from a perspective of each client router, select a respective best path by applying to the paths the one or more additional tests instead of the policy tests; and
            assign the respective best paths to the respective client routers.

11. The apparatus of claim 10, wherein the processor is configured to:
    from the perspective of the route reflector, perform the applying to the paths the ordered comparison tests by:
        applying the ordered comparison tests to a pair of the paths until one of the tests selects a preferred path among the pair of paths; and
        repeating the applying the ordered comparison tests to different pairs of the paths as necessary until the ordered comparison tests have selected the best path from among the preferred paths; and
    determine whether the best path was selected based on the policy tests exclusively based on the ones of the tests that selected the preferred paths.

12. The apparatus of claim 10, wherein:
the one or more additional tests include a lowest cost path test followed by further tests; and
the processor is configured to, from the perspective of the router reflector, perform the applying by applying to the paths the policy tests, the lowest cost path test, and the further tests in sequence until the best path is selected.

13. The apparatus of claim 12, wherein, the processor is configured to, from the perspective of each client router, perform the applying by applying to the paths the lowest cost path test and the further tests in sequence instead of the policy tests until the best path is selected.

14. The apparatus of claim 13, wherein the lowest cost path test includes a lowest cost path test that prefers a path having a lowest Internal Gateway Protocol (IGP) metric indicative of path cost leading to the destination address.

15. The apparatus of claim 10, wherein the policy tests are not based on a lowest cost path criterion and the one or more additional tests include a lowest cost path test that is based on a lowest cost path criterion.

16. One or more non-transitory computer readable storage media encoded with instructions that, when executed by a processor on route reflector in a network including client routers peered with the route reflector according to the Border Gateway Protocol and that advertise to the route reflector respective paths to a destination address, cause the processor to:

from a perspective of the route reflector, select among the paths a best path to the destination address by applying to the paths ordered comparison tests that progress from policy tests through one or more additional tests until the best path is selected;

determine whether the best path was selected based on the policy tests exclusively;

if the best path was selected based on the policy tests exclusively, assign to each of the client routers the best path as the best path to the destination address; and if the best path was not selected based on the policy based tests exclusively:

from a perspective of each client router, select a respective best path by applying to the paths the one or more additional tests instead of the policy tests; and assign the respective best paths to the respective client routers.

17. The computer readable storage media of claim 16, wherein:

the instructions to cause the processor to perform the applying from the perspective of the router reflector include instructions to the processor to perform the applying by:

applying the ordered comparison tests to a pair of the paths until one of the tests selects a preferred path among the pair of paths; and repeating the applying the ordered comparison tests to different pairs of the paths as necessary until the ordered comparison tests have selected the best path from among the preferred paths; and the determining whether the best path was selected based on the policy tests exclusively is based on the ones of the tests that selected the preferred paths.

18. The computer readable storage media of claim 17, wherein:

the one or more additional tests include a lowest cost path test followed by further tests; and the instructions to cause the processor to perform the applying from the perspective of the router reflector include instructions to cause the processor to perform the applying to the paths the policy tests, the lowest cost path test, and the further tests in sequence until the best path is selected.

19. The computer readable storage media of claim 18, wherein the instructions to cause the processor to perform the applying from the perspective of each client router include instructions to cause the processor to perform the applying to the paths the lowest cost path test and the further tests in sequence instead of the policy tests until the best path is selected.

20. The computer readable storage media of claim 19, wherein the lowest cost path test includes a lowest cost path test that prefers a path having a lowest Internal Gateway Protocol (IGP) metric indicative of path cost leading to the destination address.

21. The computer readable storage media of claim 17, wherein the policy tests are not based on a lowest cost path criterion and the one or more additional tests include a lowest cost path test that is based on a lowest cost path criterion.

* * * * *